US012567990B2

(12) United States Patent
Bhattacharyya et al.

(10) Patent No.: US 12,567,990 B2
(45) Date of Patent: Mar. 3, 2026

(54) METHODS AND SYSTEMS FOR ESTABLISHING EDGE-INCLUSIVE REAL-TIME MULTIMEDIA TELE-CONFERENCING

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Bangalore (IN); Suraj Kumar Mahato, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 243 days.

(21) Appl. No.: 18/491,321

(22) Filed: Oct. 20, 2023

(65) Prior Publication Data

US 2024/0223394 A1 Jul. 4, 2024

(30) Foreign Application Priority Data

Jan. 3, 2023 (IN) .............................. 202321000418

(51) Int. Cl.
*H04L 12/18* (2006.01)
*B25J 9/16* (2006.01)

(52) U.S. Cl.
CPC ........ *H04L 12/1822* (2013.01); *B25J 9/1689* (2013.01); *H04L 12/1827* (2013.01)

(58) Field of Classification Search
CPC ............. H04L 12/1822; H04L 12/1827; H04L 67/141; H04L 65/4038; H04L 67/104; H04L 67/12; H04L 67/2895; B25J 9/1689
See application file for complete search history.

(56) References Cited

U.S. PATENT DOCUMENTS

2021/0144517 A1* 5/2021 Guim Bernat ........ G06F 9/5072
2023/0216947 A1* 7/2023 Bernardi ................. H04L 67/10
713/150

FOREIGN PATENT DOCUMENTS

CN        112394701 A      2/2021
EP        3 846 414 A1     7/2021
WO    WO-2014037765 A1 *  3/2014   ........... H04R 29/005

OTHER PUBLICATIONS

Teledrive: An Intelligent Telepresence Solution for Collaborative Multipresence, Bhattacharyya (Year: 2022).*
(Continued)

*Primary Examiner* — Emmanuel L Moise
*Assistant Examiner* — Mariegeorges A Henry
(74) *Attorney, Agent, or Firm* — FINNEGAN, HENDERSON, FARABOW, GARRETT & DUNNER LLP

(57) ABSTRACT

The present disclosure relates to methods and systems for establishing an edge-inclusive real-time multimedia tele-conferencing using tele-robots. Conventional techniques employ a WebSocket connection for the robot-to-edge device (R2E) connection which may not meet expected real-time behaviour. The present disclosure provides a resource-friendly application protocol using WebRTC that enables the same tele-robotic WebRTC session to fork the live feed of the tele-robot for consumption by the edge device. According to the present disclosure, a peer-to-peer connection is established between the plurality of peers by the cloud signaling server, based on the type of the unique type identifier. Then, the live stream of the tele-robot, in the tele-conferencing session, is forked based on the peer-to-peer connection established (i) between the tele-robot and the broadcaster, or (ii) between the tele-robot and the edge (Continued)

Establish a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'T', then the peer-to-peer connection is established between the tele-robot and the edge device 314

Fork the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot 316

Process the stream forked from the live stream of the tele-robot, by the edge device, to obtain a sequence of frames, from time to time 318

Process the sequence of frames by the edge device, to obtain visual analytics, from time to time 320

Send the visual analytics, from time to time, by the edge device to the tele-robot, through a bi-directional data-channel present between the tele-robot and the edge device 322

Stream one or more processed video frames, to the plurality of human participants through the broadcaster in the tele-conferencing session, wherein the one or more processed video frames are obtained from (i) the live stream from the tele-robot and (ii) the visual analytics 324 device, to obtain a stream forked from the live stream, which is then used for various visual analytics.

12 Claims, 14 Drawing Sheets

(56)  References Cited

OTHER PUBLICATIONS

Bhattacharyya et al., "*Teledrive*—An Intelligent Telepresence Solution for "*Collaborative Multi-presence*" through a Telerobot," Comsnets (2022).
Pinikas et al., "Extension of the WebRTC Data Channel Towards Remote Collaboration and Control," (2016).

* cited by examiner

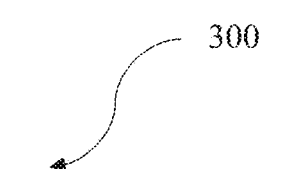

300

Utilize a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register 302

Initiate a tele-conferencing session between (i) a plurality of human participants, (ii) a tele-robot, and (iii) an edge device associated to the tele-robot, through a session manager using the Web Real-Time Communication (WebRTC) 304

Form a plurality of peers for the tele-conferencing session, wherein plurality of peers comprises: (i) the plurality of human participants, (ii) the tele-robot, (iii) the edge device, and (iv) the broadcaster 306

Assign a unique type identifier for each of the plurality of peers, using predefined type identifiers, wherein the unique type identifier for (i) each human participant of the plurality of human participants is 'U', (ii) the tele-robot is 'R', (iii) the edge device is 'E', and (iv) the broadcaster is 'B' 308

Advertise by each of the plurality of peers, with the associated unique type identifier along with a connect request, to the cloud signaling server 310

Capture a live stream from the tele-robot, over the public cloud 312

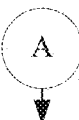

Establish a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device 314

Fork the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot 316

Process the stream forked from the live stream of the tele-robot, by the edge device, to obtain a sequence of frames, from time to time 318

Process the sequence of frames by the edge device, to obtain visual analytics, from time to time 320

Send the visual analytics, from time to time, by the edge device to the tele-robot, through a bi-directional data-channel present between the tele-robot and the edge device 322

Stream one or more processed video frames, to the plurality of human participants through the broadcaster in the tele-conferencing session, wherein the one or more processed video frames are obtained from (i) the live stream from the tele-robot and (ii) the visual analytics 324

FIG. 3B

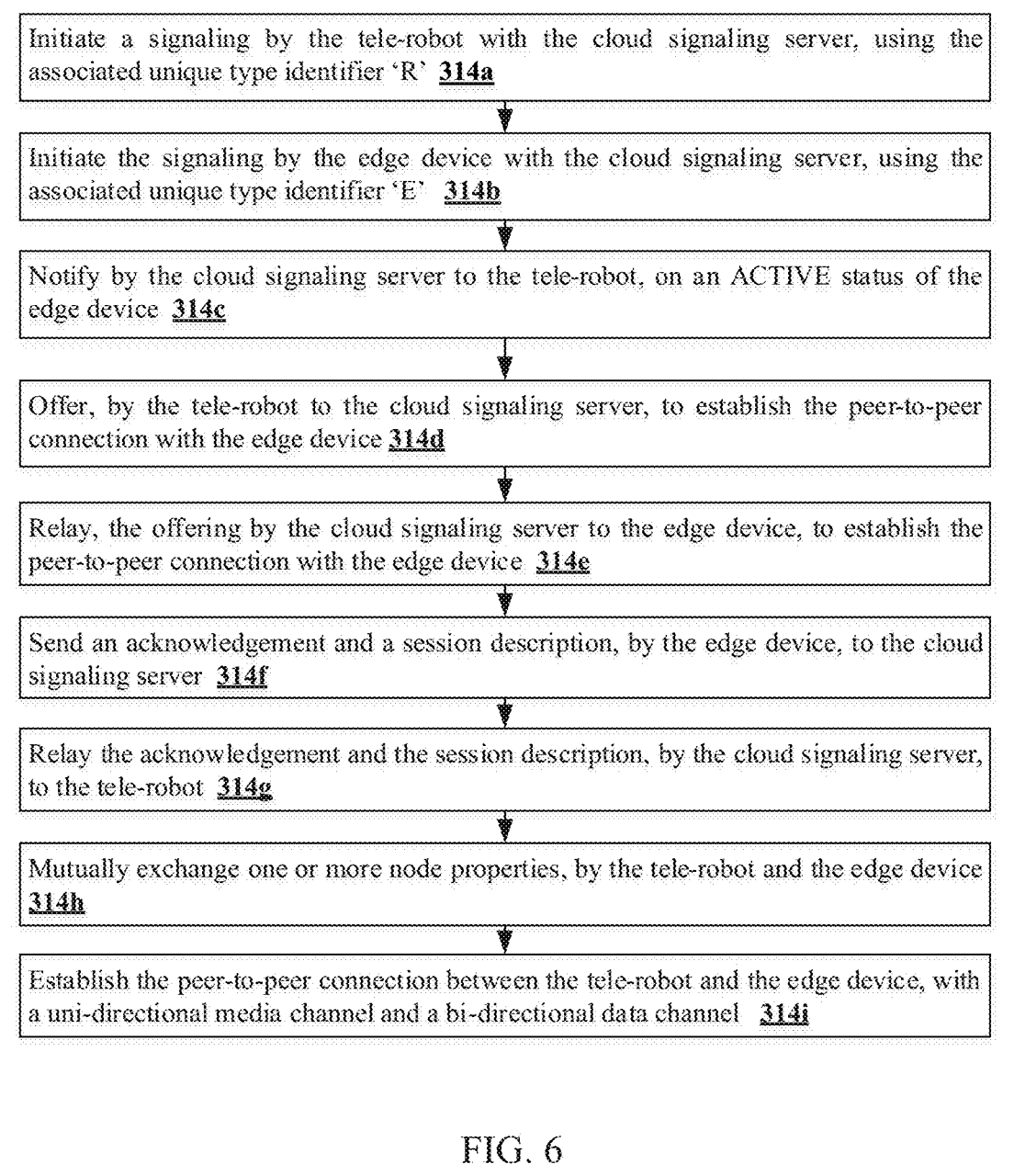

Initiate a signaling by the tele-robot with the cloud signaling server, using the associated unique type identifier 'R' 314a

Initiate the signaling by the edge device with the cloud signaling server, using the associated unique type identifier 'E' 314b

Notify by the cloud signaling server to the tele-robot, on an ACTIVE status of the edge device 314c

Offer, by the tele-robot to the cloud signaling server, to establish the peer-to-peer connection with the edge device 314d

Relay, the offering by the cloud signaling server to the edge device, to establish the peer-to-peer connection with the edge device 314e

Send an acknowledgement and a session description, by the edge device, to the cloud signaling server 314f

Relay the acknowledgement and the session description, by the cloud signaling server, to the tele-robot 314g

Mutually exchange one or more node properties, by the tele-robot and the edge device 314h

Establish the peer-to-peer connection between the tele-robot and the edge device, with a uni-directional media channel and a bi-directional data channel 314i

FIG. 6

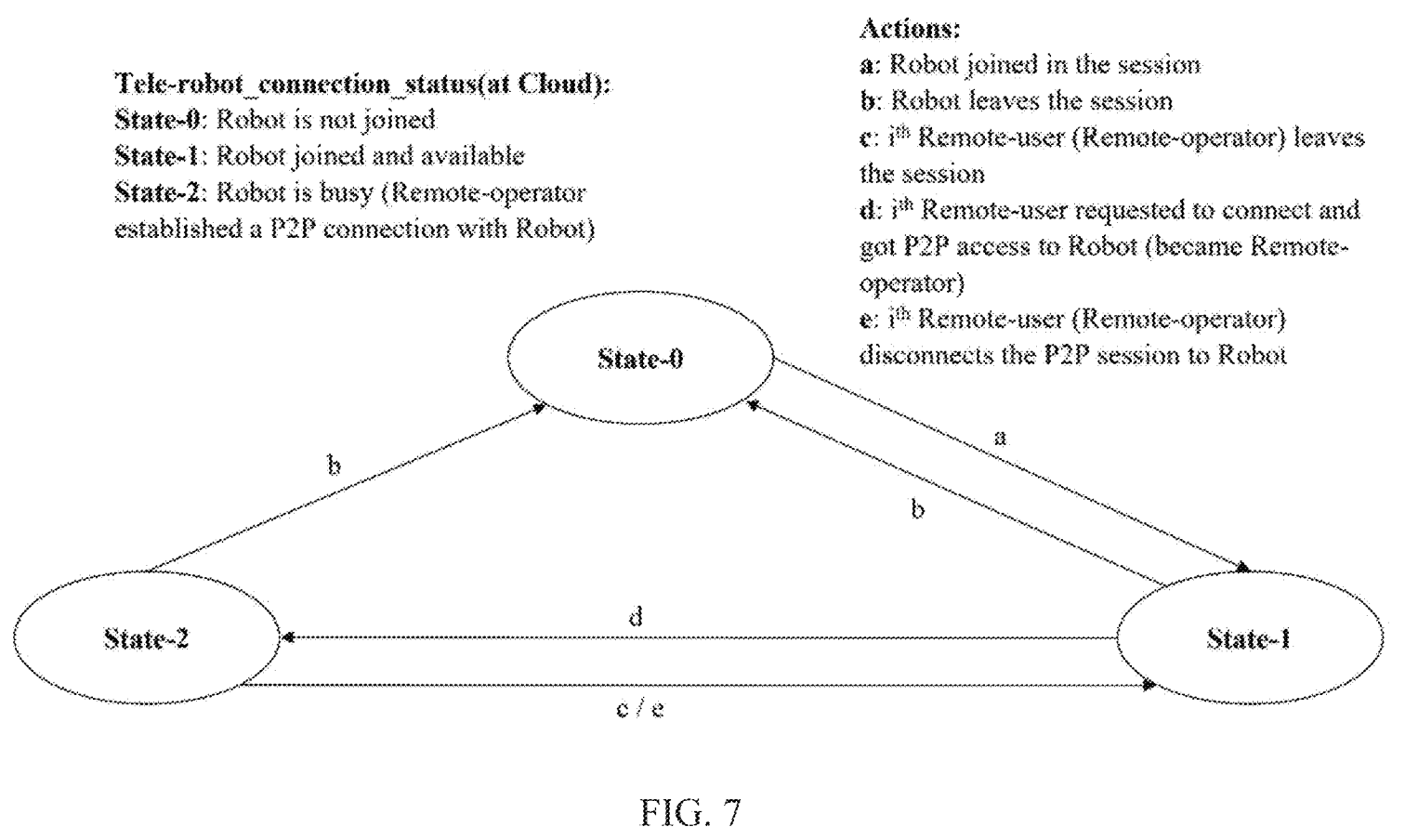

Tele-robot_connection_status(at Cloud):

State-0: Robot is not joined
State-1: Robot joined and available
State-2: Robot is busy (Remote-operator established a P2P connection with Robot)

Actions:

a: Robot joined in the session
b: Robot leaves the session
c: $i^{th}$ Remote-user (Remote-operator) leaves the session
d: $i^{th}$ Remote-user requested to connect and got P2P access to Robot (became Remote-operator)
e: $i^{th}$ Remote-user (Remote-operator) disconnects the P2P session to Robot

FIG. 7

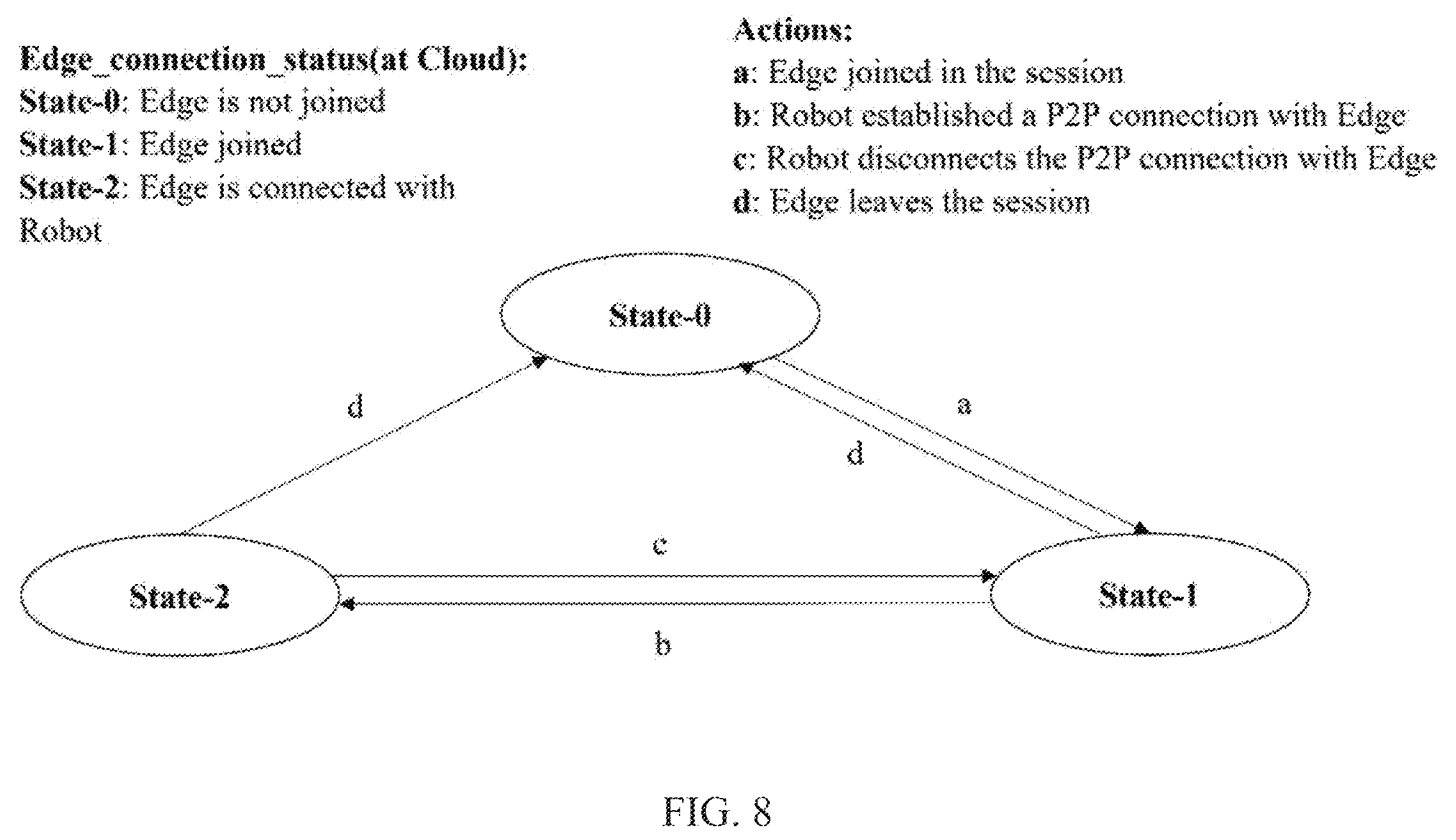

Actions:

a: Edge joined in the session b: Robot established a P2P connection with Edge c: Robot disconnects the P2P connection with Edge d: Edge leaves the session Edge_connection_status(at Cloud):

State-0: Edge is not joined

State-1: Edge joined

State-2: Edge is connected with Robot

FIG. 8

Obtain the live stream of the tele-robot, using a media application programming interface 316a1

Publish the live stream of the tele-robot over a uni-directional media channel, in the peer-to-peer connection established between the tele-robot and the edge device, using a stream publishing application programming interface 316a2

Receive the live stream of the tele-robot, by the edge device, using a stream receiving application programming interface 316a3

Extract one or more video frames from the live stream, and putting into a container at a predefined frame rate, to generate a sequence of frames 316a4

Save the sequence of frames in a local file repository of the edge device, using a file storing application programming interface and a WebSocket 316a5

FIG. 10

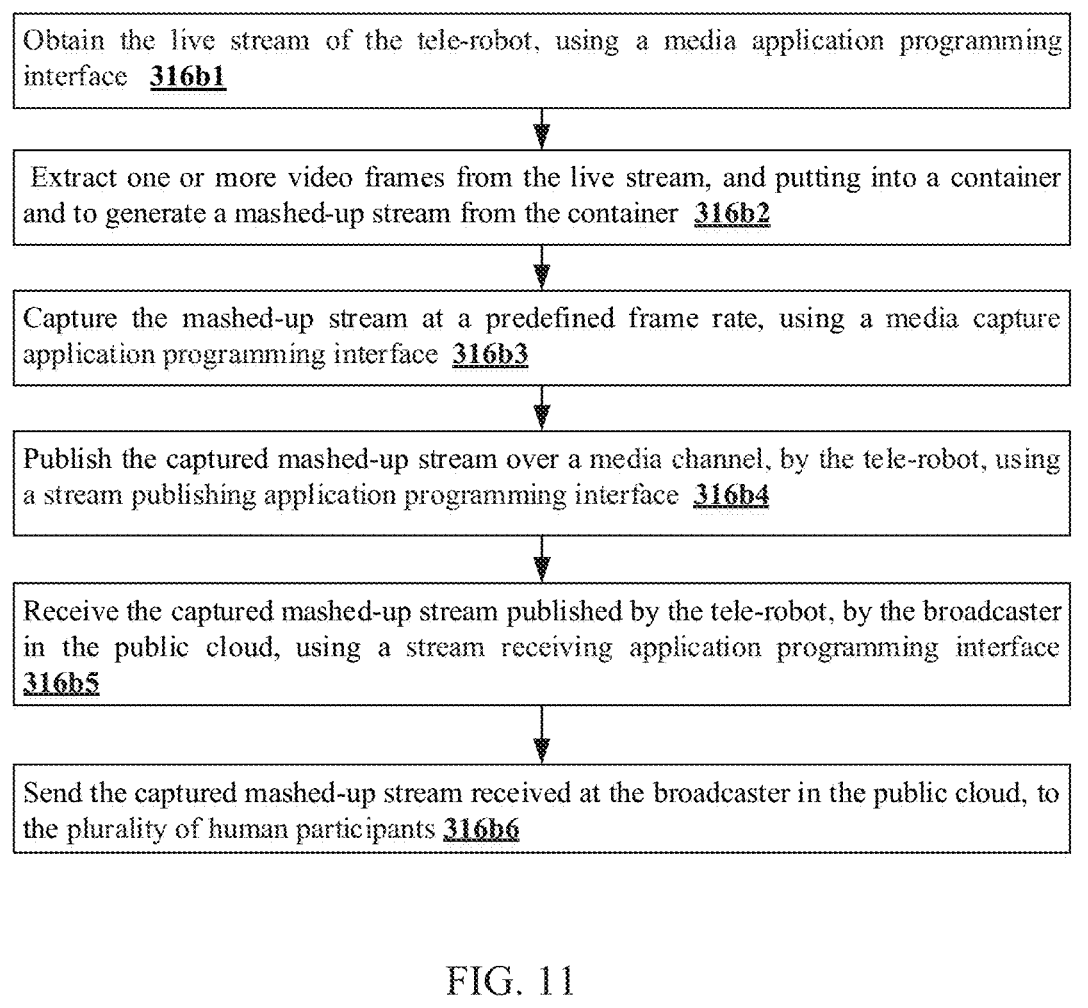

Obtain the live stream of the tele-robot, using a media application programming interface 316b1

↓

Extract one or more video frames from the live stream, and putting into a container and to generate a mashed-up stream from the container 316b2

↓

Capture the mashed-up stream at a predefined frame rate, using a media capture application programming interface 316b3

↓

Publish the captured mashed-up stream over a media channel, by the tele-robot, using a stream publishing application programming interface 316b4

↓

Receive the captured mashed-up stream published by the tele-robot, by the broadcaster in the public cloud, using a stream receiving application programming interface 316b5

↓

Send the captured mashed-up stream received at the broadcaster in the public cloud, to the plurality of human participants 316b6

FIG. 11

METHODS AND SYSTEMS FOR ESTABLISHING EDGE-INCLUSIVE REAL-TIME MULTIMEDIA TELE-CONFERENCING

PRIORITY CLAIM

This U.S. patent application claims priority under 35 U.S.C. § 119 to: Indian Patent Application No. 202321000418, filed on Jan. 3, 2023. The entire contents of the aforementioned application are incorporated herein by reference.

TECHNICAL FIELD

The disclosure herein generally relates to the field of tele-robotics, and, more particularly, to methods and systems for establishing an edge-inclusive real-time multimedia tele-conferencing using tele-robots.

BACKGROUND

Tele-robots need embodied intelligence processes to provide many intelligent services by understanding the context of the user as well as a surrounding environment. These intelligent processes are computationally intensive. Being constrained in energy and computing capacity, such computations may not be performed by the tele-robot itself and thus need to be offloaded. An edge computing paradigm (using an edge device) is a de facto choice for such offloading due to potentially much lower robot-to-edge (R2E) communication latency and a higher reliability of the R2E channel than a Cloud.

In a multi-user scenario, the multimedia tele-conferencing session is not just a peer-to-peer (P2P), rather multiple human users from distant locations may join the session while only one of the remote users may acquire the privilege of a remote operator at a time. The other users remain as observers. A visual feed from the tele-robot must be analyzed in real-time to provide important back to the operator or other observers. Hence, the live feed from the tele-robot must be streamed not only to the remote human users, but also to the edge device for the real-time processing.

In the conventional techniques, the tele-robots use Web Real-time communication (WebRTC) for the real-time multimedia conferencing in both off-self products or in experimental proof of concepts (PoCs). There are no standard means for the robot-to-edge device (R2E) connection. Many conventional techniques employ a WebSocket connection. However, such connections may not meet the expected real-time behaviour. Further, the camera resource is already occupied by the WebRTC for the multimedia conferencing. Hence special arrangements are required to stream the same camera live feed to the edge device.

SUMMARY

Embodiments of the present disclosure present technological improvements as solutions to one or more of the above-mentioned technical problems recognized by the inventors in conventional systems.

In an aspect, there is provided a processor-implemented method for establishing an edge-inclusive real-time multimedia tele-conferencing. The method comprising the steps of: utilizing a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register; initiating a tele-conferencing session between (i) a plurality of human participants, (ii) a tele-robot, and (iii) an edge device associated with the tele-robot, through a session manager using the Web Real-Time Communication (WebRTC); forming a plurality of peers for the tele-conferencing session, wherein the plurality of peers comprises: (i) the plurality of human participants, (ii) the tele-robot, (iii) the edge device, and (iv) the broadcaster; assigning a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B'; advertising by each of the plurality of peers, with the associated unique type identifier along with a connect request, to the cloud signaling server; capturing a live stream from the tele-robot, over the public cloud; establishing a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device; forking the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot; processing the stream forked from the live stream of the tele-robot, by the edge device, to obtain a sequence of frames, from time to time; processing the sequence of frames by the edge device, to obtain visual analytics, from time to time; sending the visual analytics, from time to time, by the edge device to the tele-robot, through a bi-directional data-channel present between the tele-robot and the edge device; and streaming one or more processed video frames, to the plurality of human participants through the broadcaster in the tele-conferencing session, wherein the one or more processed video frames are obtained from (i) the live stream from the tele-robot and (ii) the visual analytics.

In another aspect, there is provided a system for establishing an edge-inclusive real-time multimedia tele-conferencing. The system comprising: a memory storing instructions; one or more Input/Output (I/O) interfaces; and one or more hardware processors coupled to the memory via the one or more I/O interfaces, wherein the one or more hardware processors are configured by the instructions to: utilize a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register; initiate a tele-conferencing session between (i) a plurality of human participants, (ii) a tele-robot, and (iii) an edge device associated with the tele-robot, through a session manager using the Web Real-Time Communication (WebRTC); form a plurality of peers for the tele-conferencing session, wherein the plurality of peers comprises: (i) the plurality of human participants, (ii) the tele-robot, (iii) the edge device, and (iv) the broadcaster; assign a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B'; advertise by each of the plurality of peers, with the associated unique type identifier along with a connect request, to the cloud signaling server; capture a live stream from the tele-robot, over the public cloud; establish a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device; fork the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot; process the stream forked from the live stream of the tele-robot, by the edge device, to obtain a sequence of frames, from time to time; process the sequence of frames by the edge device, to obtain visual analytics, from time to time; send the visual analytics, from time to time, by the edge device to the tele-robot, through a bi-directional data-channel present between the tele-robot and the edge device; and stream one or more processed video frames, to the plurality of human participants through the broadcaster in the tele-conferencing session, wherein the one or more processed video frames are obtained from (i) the live stream from the tele-robot and (ii) the visual analytics.

In yet another aspect, there are provided one or more non-transitory machine-readable information storage mediums comprising one or more instructions which when executed by one or more hardware processors cause: utilizing a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register; initiating a tele-conferencing session between (i) a plurality of human participants, (ii) a tele-robot, and (iii) an edge device associated with the tele-robot, through a session manager using the Web Real-Time Communication (WebRTC); forming a plurality of peers for the tele-conferencing session, wherein the plurality of peers comprises: (i) the plurality of human participants, (ii) the tele-robot, (iii) the edge device, and (iv) the broadcaster; assigning a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B'; advertise by each of the plurality of peers, with the associated unique type identifier along with a connect request, to the cloud signaling server; capturing a live stream from the tele-robot, over the public cloud; establishing a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device; forking the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot; processing the stream forked from the live stream of the tele-robot, by the edge device, to obtain a sequence of frames, from time to time; processing the sequence of frames by the edge device, to obtain visual analytics, from time to time; sending the visual analytics, from time to time, by the edge device to the tele-robot, through a bi-directional data-channel present between the tele-robot and the edge device; and streaming one or more processed video frames, to the plurality of human participants through the broadcaster in the tele-conferencing session, wherein the one or more processed video frames are obtained from (i) the live stream from the tele-robot and (ii) the visual analytics.

In an embodiment, the edge device is part of the edge-inclusive real-time multimedia tele-conferencing, and invisible to the plurality of human participants.

In an embodiment, establishing the peer-to-peer connection between the tele-robot and the edge device if the unique type identifier is 'E', comprises: initiating a signaling by the tele-robot with the cloud signaling server, using the associated unique type identifier 'R'; initiating the signaling by the edge device with the cloud signaling server, using the associated unique type identifier 'E'; notifying by the cloud signaling server to the tele-robot, on an ACTIVE status of the edge device; offering, by the tele-robot to the cloud signaling server, to establish the peer-to-peer connection with the edge device; relaying, the offering by the cloud signaling server to the edge device, to establish the peer-to-peer connection with the edge device; sending an acknowledgement and a session description, by the edge device, to the cloud signaling server; relaying the acknowledgement and the session description, by the cloud signaling server, to the tele-robot; mutually exchanging one or more node properties, by the tele-robot and the edge device; and establishing the peer-to-peer connection between the tele-robot and the edge device, with a uni-directional media channel and a bi-directional data channel.

In an embodiment, forking the live stream of the tele-robot, in the tele-conferencing session, with the peer-to-peer connection established between the tele-robot and the edge device, comprises: obtaining the live stream of the tele-robot, using a media application programming interface; publishing the live stream of the tele-robot over a uni-directional media channel, in the peer-to-peer connection established between the tele-robot and the edge device, using a stream publishing application programming interface; receiving the live stream of the tele-robot, by the edge device, using a stream receiving application programming interface; extracting one or more video frames from the live stream, and putting into a container at a predefined frame rate, to generate a sequence of frames; and saving the sequence of frames in a local file repository of the edge device, using a file storing application programming interface and a WebSocket.

In an embodiment, forking the live stream of the tele-robot, in the tele-conferencing session, with the peer-to-peer connection established between the tele-robot and the broadcaster, comprises: obtaining the live stream of the tele-robot, using a media application programming interface; extracting one or more video frames from the live stream, and putting into a container and to generate a mashed-up stream from the container; capturing the mashed-up stream at a predefined frame rate, using a media capture application programming interface; publishing the captured mashed-up stream over a media channel, by the tele-robot, using a stream publishing application programming interface; receiving the captured mashed-up stream published by the tele-robot, by the broadcaster in the public cloud, using a stream receiving application programming interface; and sending the captured mashed-up stream received at the broadcaster in the public cloud, to the plurality of human participants.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B illustrate exemplary flow diagrams of a processor-implemented method for establishing an edge-inclusive real-time multimedia tele-conferencing, in accordance with some embodiments of the present disclosure.

FIG. 6 illustrates exemplary flow diagram for establishing the peer-to-peer connection between the tele-robot and the edge device if a unique type identifier is 'E', in accordance with some embodiments of the present disclosure.

FIG. 7 shows a state diagram of the tele-robot maintained by a state register at the cloud, in accordance with some embodiments of the present disclosure.

FIG. 8 shows a state diagram of the edge device maintained by the state register at the cloud, in accordance with some embodiments of the present disclosure.

FIG. 10 illustrates exemplary flow diagram for forking the live stream of the tele-robot, in the tele-conferencing session, with the peer-to-peer connection established between the tele-robot and the edge device, in accordance with some embodiments of the present disclosure.

FIG. 11 illustrates exemplary flow diagram for forking the live stream of the tele-robot, in the tele-conferencing session, with the peer-to-peer connection established between the tele-robot and the broadcaster, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

A telepresence robot or a tele-robot is a remote-operated, wheeled device with a video conferencing (a real-time multimedia tele-conferencing) gadget/capability that can be driven around from remote locations. An operator using his or her computing device or personal digital assistant (PDA) can drive the tele-robot at a remote location, see things and speak out to people through a camera installed in the tele-robot. Thus, the tele-robot acts like a physical avatar of the remote operator. If the tele-robot is equipped with limbs (like grippers, etc.) then the telepresence system transforms into a teleoperation system and the operator can then do some remote operations (like gripping, touching, etc.) along with moving the tele-robot. The telepresence and the tele-operation are combinedly addressed in the paradigm of a tele-robotics. However, in an advanced scenario, the tele-robot would need embodied intelligence to provide many intelligent services by understanding the context of the user as well as a surrounding environment.

These intelligent processes are computationally intensive. But, being constrained in energy and computing capacity, such computations may not be performed by the tele-robot itself and thus need to be offloaded. In the modern era, an edge computing paradigm (using an edge device) has become a de facto choice for such offloading due to potentially much lower robot-to-edge (R2E) communication latency and a higher reliability of the R2E channel than a Cloud.

In a multi-user scenario, the multimedia tele-conferencing session is not just a peer-to-peer (P2P), rather multiple human users from distant locations may join the session while only one of the remote users may acquire the privilege of a remote operator at a time. The other users remain as observers.

Figure 1:
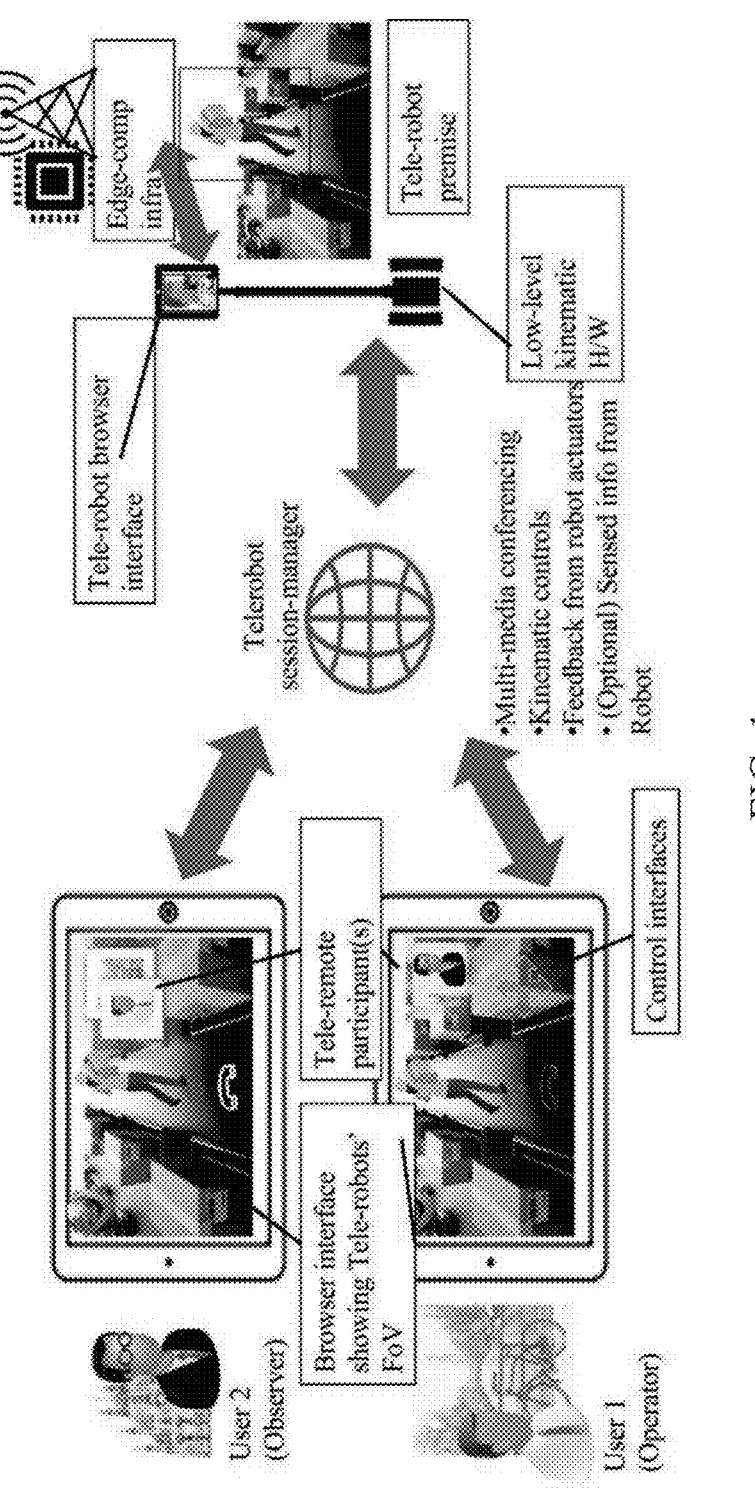
FIG. 1 is an exemplary block diagram depicting a federated yet exclusive robot control for multi-user tele-presence in a remote factory inspection scenario in a prior-art.

FIG. 1 is an exemplary block diagram (in a grey-scale) depicting a federated yet exclusive robot control for multi-user tele-presence in a remote factory inspection scenario in a prior-art. As shown in FIG. 1, one inspector is operating the tele-robot while the other is just an observer. A session manager is in a cloud, but the edge device infrastructure is used for offloading the computation. Now, consider a situation where the visual live feed from the tele-robot must be analyzed in real-time to provide important analytics back to the operator or other observers. In such cases, the live feed from the tele-robot must be streamed not only to the remote human participants, but also to the edge device for the real-time processing.

In the conventional techniques, the tele-robots use Web Real-time communication (WebRTC) for the real-time multimedia conferencing in both off-self products or in experimental proof of concepts (PoCs). There are no standard means for the robot-to-edge device (R2E) connection. Many conventional techniques employ a WebSocket connection.

However, such connections may not meet the expected real-time behaviour. Further, the camera resource is already occupied by the WebRTC for the multimedia conferencing. Hence special arrangements are required to stream the same camera live feed to the edge device.

The present disclosure herein provides methods and systems for establishing an edge-inclusive real-time multimedia tele-conferencing, to solve the technical problems in the art, where a session manager of the WebRTC, which enables the multimedia conferencing, is also be leveraged for the R2E exchange for the real-time video or image processing. According to the present disclosure, the WebRTC mechanism consider all the participating nodes as part of the conference. But, in the given scenario, the edge node (device) is not a participant of the conference but only a consumer of the visual live feed of the tele-robot. So, the present disclosure provides a practically deployable resource-friendly application protocol using the WebRTC application programming interfaces (APIs) that enables the same tele-robotic WebRTC session to fork the live feed of the tele-robot for consumption by the edge device. The WebRTC by default does not propose any such mechanism to fork the video traffic for one way consumption.

Referring now to the drawings, and more particularly to FIG. 2 through FIG. 13, where similar reference characters denote corresponding features consistently throughout the figures, there are shown preferred embodiments and these embodiments are described in the context of the following exemplary systems and/or methods.

Figure 2:
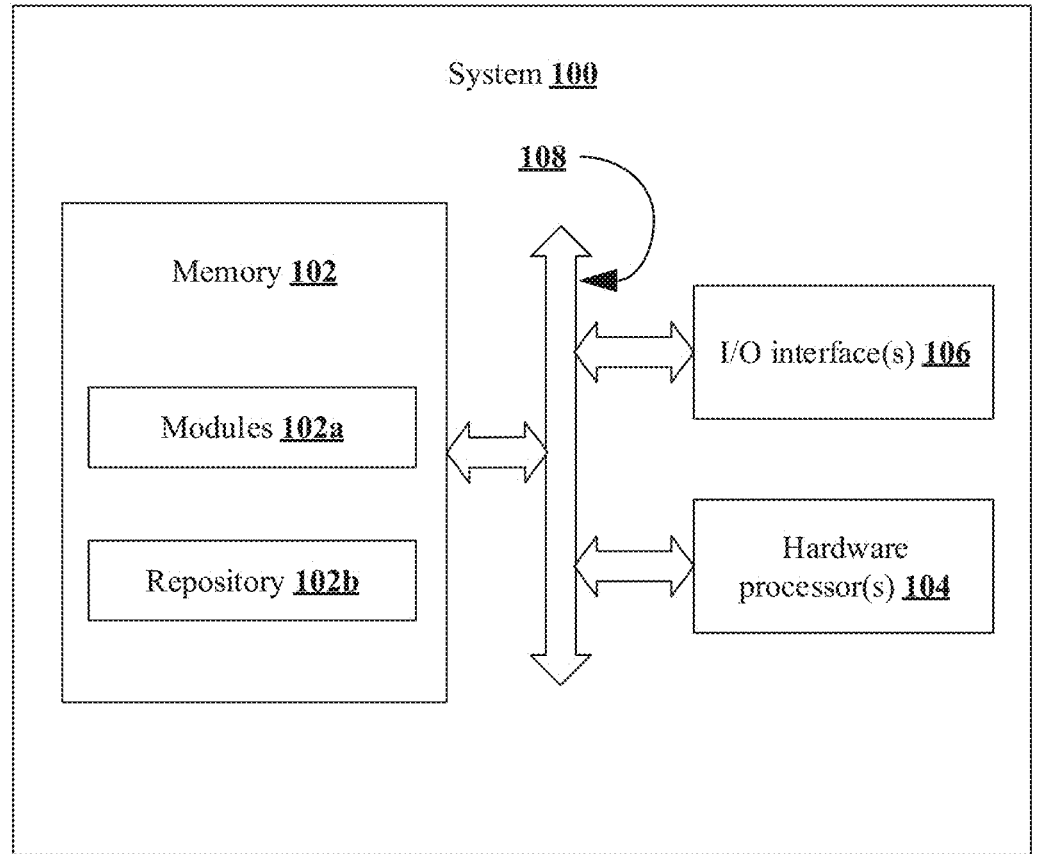
FIG. 2 is an exemplary block diagram of a system for establishing an edge-inclusive real-time multimedia tele-conferencing, in accordance with some embodiments of the present disclosure.

FIG. 2 is an exemplary block diagram of a system 100 for establishing an edge-inclusive real-time multimedia tele-conferencing, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 2). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 2) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Referring to FIG. 3A and FIG. 3B, components and functionalities of the system 100 are described in accordance with an example embodiment of the present disclosure. For example, FIG. 3A and FIG. 3B illustrate exemplary flow diagrams of a processor-implemented method 300 for establishing the edge-inclusive real-time multimedia tele-conferencing, in accordance with some embodiments of the present disclosure. Although steps of the method 300 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to utilize a public cloud and a Web Real-Time Communication (WebRTC) for establishing the edge-inclusive real-time multimedia tele-conferencing of the present disclosure. The public cloud includes a cloud signaling server (CSS) and a broadcaster.

The cloud signaling server (CSS) is responsible for setting up the peer-to-peer (P2P) channels. The broadcaster is a special type of node comprising of a media manager (MM) and a state register (SR). The broadcaster takes care of all the video merging and routing to different peers using the media manager and maintains connection states using the state register (SR).

At step 304 of the method 300, the one or more hardware processors 104 of the system 100 are configured to initiate a tele-conferencing session between (i) a plurality of human participants, (ii) a tele-robot, and (iii) an edge device associated to the tele-robot. The plurality of human participants, the tele-robot, and the edge device associated to the tele-robot form total number of the participants in the tele-conferencing session. The tele-conferencing session is initiated between all the participants through the session manager using the Web Real-Time Communication (WebRTC). The edge device is part of the edge-inclusive real-time multimedia tele-conferencing, but invisible to the plurality of human participants.

Figure 4:
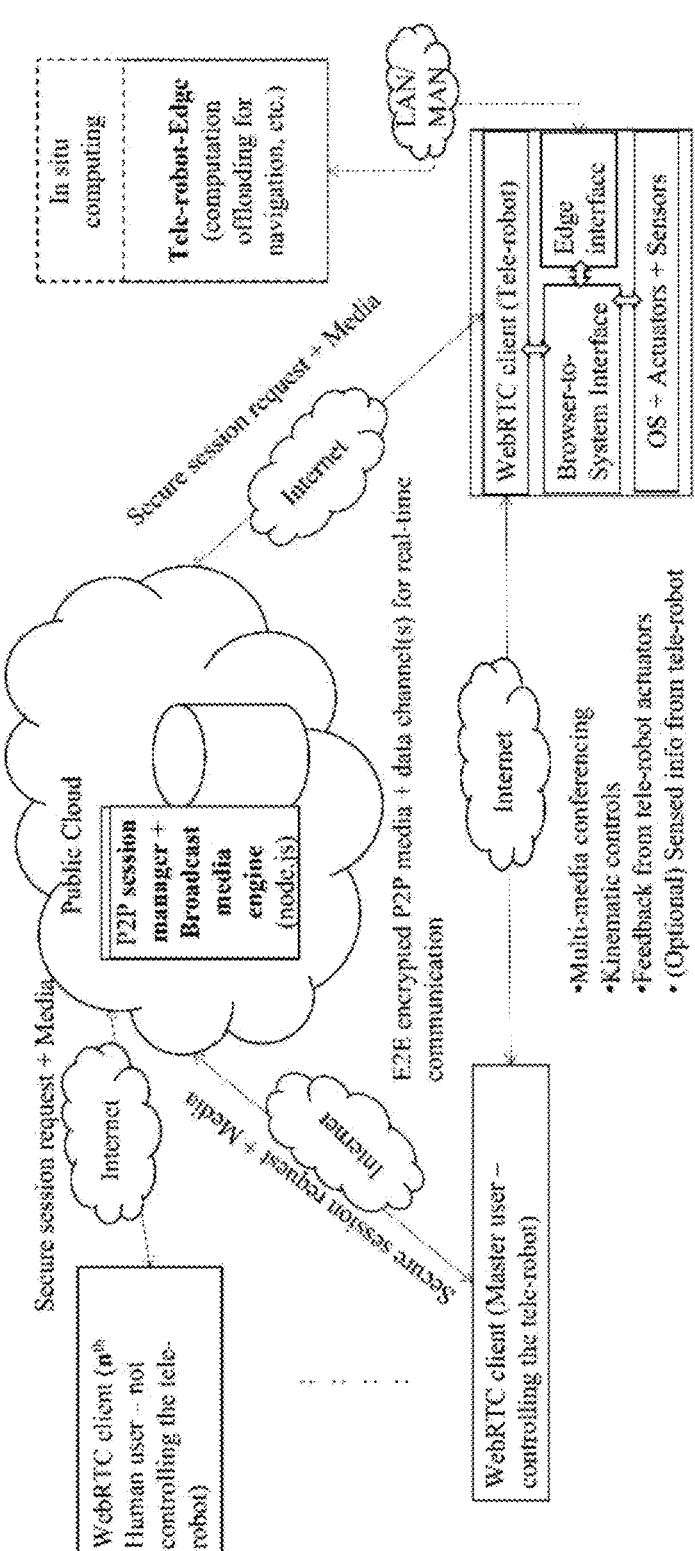
FIG. 4 illustrates a basic architecture of a network for a tele-conferencing session using a public cloud and a Web Real-Time Communication (WebRTC), in accordance with some embodiments of the present disclosure.

FIG. 4 illustrates a basic architecture of a network for a tele-conferencing session using a public cloud and a Web Real-Time Communication (WebRTC), in accordance with some embodiments of the present disclosure. As shown in FIG. 4, the cloud signaling server (CSS) adapts the signaling mechanism based on the context of the node requesting to peer, which is not available in standard WebRTC-based solutions.

At step 306 of the method 300, the one or more hardware processors 104 of the system 100 are configured to form a plurality of peers for the tele-conferencing session. The plurality of peers includes: (i) the plurality of human participants, (ii) the tele-robot, (iii) the edge device, and (iv) the broadcaster of the public cloud. Each human participant among the plurality of human participants, who is currently operating the robot, at their turn, is referred as an operator human participant or remote operator, or a remote user or an active human participant. Hence at each time, one human participant becomes the operator human participant, and such human participant will get a set of privileges for the tele-conferencing session. The rest of the human participants who are not operating the robot at that time as refereed as observing human participants.

At step 308 of the method 300, the one or more hardware processors 104 of the system 100 are configured to assign a unique type identifier for each of the plurality of peers formed at step 306 of the method 300, using one or more predefined type identifiers. The one or more predefined type identifiers are used to identify the type of the participants among the plurality of participants in the tele-conferencing session. The unique type identifier for each human participant of the plurality of human participants is 'U'. The unique type identifier for the tele-robot is 'R'. The unique type identifier for the edge device is 'E'. The unique type identifier for the broadcaster is 'B'.

At step 310 of the method 300, the one or more hardware processors 104 of the system 100 are configured to advertise by each of the plurality of peers, with the associated unique type identifier assigned at step 308 of the method 300, to the cloud signaling server of the public cloud. Further, a connect request is also advertised by each of the plurality of peers, along with the associated unique type identifier.

At step 312 of the method 300, the one or more hardware processors 104 of the system 100 are configured to capture a live stream from the tele-robot, over the public cloud. The live stream is captured from the camera device present in the tele-robot. The captured live stream is to be transmitted over the public cloud from time to time in the current tele-conferencing session and will continue until the tele-conferencing session is terminated or closed.

At step 314 of the method 300, the one or more hardware processors 104 of the system 100 are configured to establish a peer-to-peer connection between the plurality of peers by the cloud signaling server, based on the associated unique type identifier assigned at step 308 of the method 300 and advertised at the step 310 of the method 300. If the unique type identifier advertised at step 310 of the method 300 is 'U', then the peer-to-peer connection is established between each human participant and the broadcaster. If the unique type identifier advertised at step 310 of the method 300 is 'E', then the peer-to-peer connection is established between the tele-robot and the edge device. Similarly, other peer-to-peer connections are established between the peers associated unique type identifier.

Figure 5:
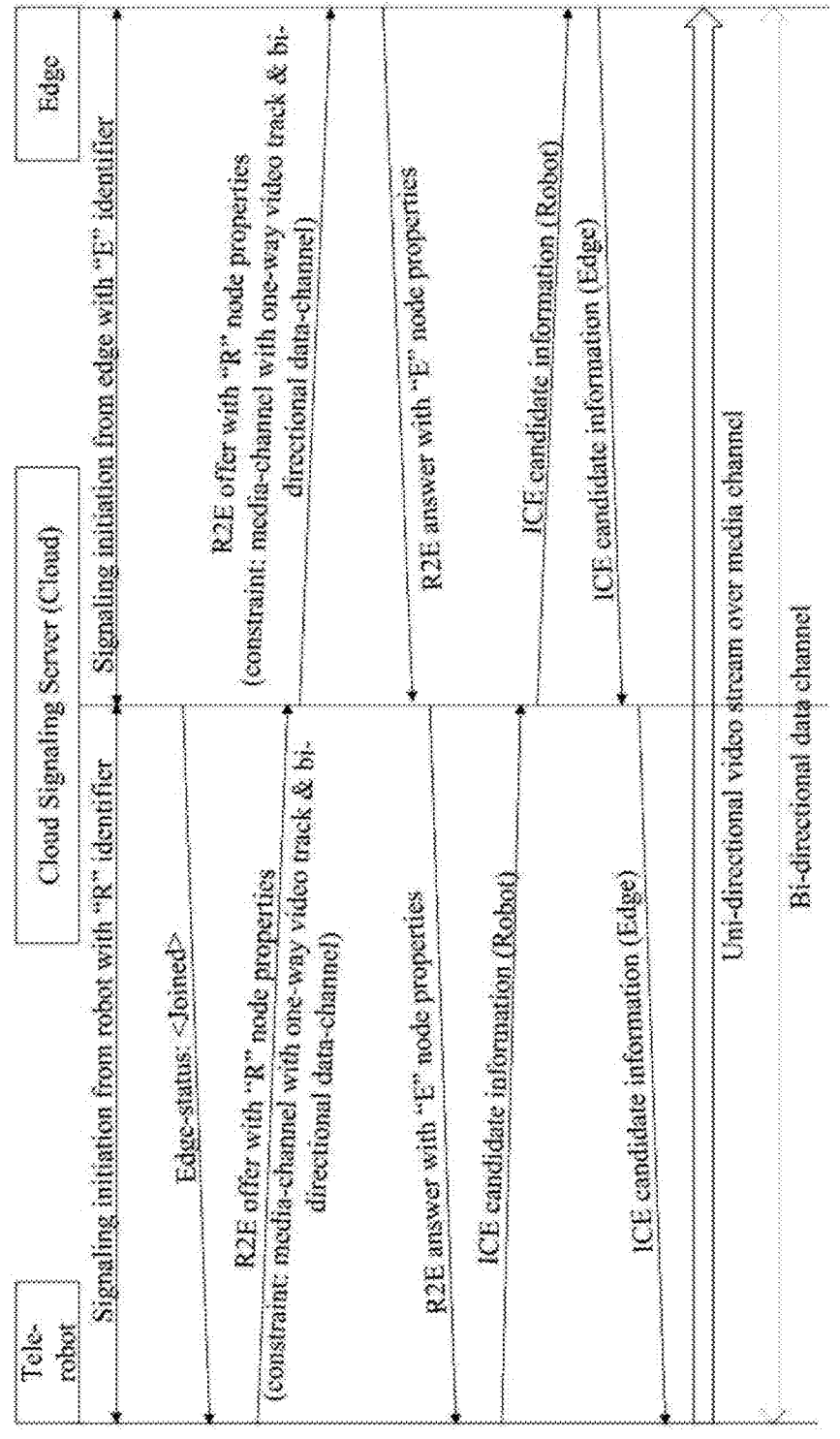
FIG. 5 is a flow diagram depicting a signaling exchange protocol to establish a peer-to-peer connection between a tele-robot and an edge device with a cloud signaling server of the cloud, in accordance with some embodiments of the present disclosure.

FIG. 5 is a flow diagram depicting a signaling exchange protocol to establish the peer-to-peer connection between the tele-robot and the edge device with the cloud signaling server of the cloud, in accordance with some embodiments of the present disclosure. As shown in FIG. 5, when a peer with the unique type identifier 'E' sends a connection request then, the peer-to-peer connection is established between the tele-robot and the edge device (with a media and a data channel). In all other cases, the peer-to-peer connection is established between the broadcaster and the requesting node (mostly the human participants). Thus, the tele-robot maintains double peer-to-peer connection relation: one with the edge device for computation offload and the other with the broadcaster for normal video conferencing. This way the cloud signaling server achieves the fundamental paradoxical objective to keep the edge device within the mechanism while ensuring to exclude it from the actual multimedia conference.

An exemplary JSON packet structure and message formats for the signaling exchanges to establish the peer-to-peer connection between the tele-robot and the edge device in the cloud, is mentioned below:

• Packet structure (for signaling): in JSON format:

{

"connection-type": <>,

-continued

```
         "room-id": <>,
        "message-type": <>,
        "message": <>
        }
    ○ "Connection-type":   0: indicates Broadcast session
                           1: indicates P2P connection between Robot
        and Remote-user
                           2: indicates R2E P2P connection between
            Robot and Edge
            "Room-id": contains room-id for the session
    "Message-type":
        1: Request connection/disconnection    2: Send connection request
    acceptance
        3: Initiate connection                 4: Send connection
    establishment status
        5: Send Robot-connection-status 6: Send Edge-connection-status
        7: Send Offer                   8: Send Answer
        9: Send ICE Candidate
            ○ "Message": contains type-specific messages in JSON format
                i. Request connection/disconnection:
                    {"request": < 0 (disconnect) / 1 (connect) >,
                    "peer_id": <>,
                    "peer-type": < 'B' (broadcaster) / 'U' (remote-user) / 'R'
                    (robot) / 'E' (edge) >
                    }
                ii. Send connection request acceptance:
                    {"acceptance-status": < 0 (reject) / 1 (accept) >,
                    "robot-id": <
                    "master-id": <>,
                    "robot-connection-status": < state- 0/1/2 >
                    }
                iii. Initiate connection: {"peer_id": <>, "peer-type": < 'B'
                    (broadcaster) / 'U' (remote-user) / 'R' (robot) / 'E' (edge)
                    > }
                iv. Send connection establishment status:
                    { "peer_id": <>,
                    "status": < 0 (channel not established) / 1 (channel
                    established) >
                    }
                v. Send Robot-connection-status:
                    { "master_id": <>,
                    "robot-connection-status": < state- 0/1/2 >
                    }
                vi. Send Edge-connection-status: { "edge-connection-
                    status": < state- 0/1/2 > }
                vii. Send Offer: { "peer_id": <>, "sdp": <RTC Session
                    Description> }
                viii. Send Answer: { "peer_id": <>, "sdp": <RTC Session
                    Description> }
                ix. Send ICE Candidate: { "peer_id": <>, "candidate": <ICE
                    Candidate>
```

Note:-
Send Offer, Answer and ICE Candidate-these 3 individual messages are based on standard WebRTC format.

FIG. 6 illustrates exemplary flow diagram for establishing the peer-to-peer connection between the tele-robot and the edge device if the unique type identifier is 'E', in accordance with some embodiments of the present disclosure. As shown in FIG. 6, initially, at step 314a, the tele-robot initiates a signaling with the cloud signaling server, using the associated unique type identifier 'R'. At step 314b, the edge device initiates the signaling with the cloud signaling server, using the associated unique type identifier 'E'. When the edge device acquires an ACTIVE status, then at step 314c, the cloud signaling server notifies the tele-robot on the ACTIVE status of the edge device. At step 314d, the tele-robot provides an offer to the cloud signaling server, to establish the peer-to-peer connection with the edge device. FIG. 7 shows a state diagram of the tele-robot maintained by the state register at the cloud, in accordance with some embodiments of the present disclosure. FIG. 8 shows a state diagram of the edge device maintained by the state register at the cloud, in accordance with some embodiments of the present disclosure.

At step 314e, the offer provided at step 314d is relayed by the cloud signaling server to the edge device, to establish the peer-to-peer connection with the edge device. At step 314f, an acknowledgement and a session description are sent by the edge device to the cloud signaling server. At step 314g, the acknowledgement and the session description sent by the edge device at step 314f are relayed, by the cloud signaling server to the tele-robot. At step 314h, both the tele-robot and the edge device mutually exchanges one or more node properties. Last, at step 314i, the peer-to-peer connection is established between the tele-robot and the edge device. The established peer-to-peer connection comprises a uni-directional media channel and a bi-directional data channel between the tele-robot and the edge device.

Now, the tele-robot is to be prevented from sharing the entire conference to the edge device but needs to allow it to as a relay, only to share its live stream (feed) to the edge device when the application demands. To achieve this, the tele-robot forks the camera stream by duplicating it on the two peer-to-peer media channels it maintains—one with the broadcaster and the other with the edge device. However, the peer-to-peer connection status for the edge device and the tele-robot are still served to the cloud signaling server.

At step 316 of the method 300, the one or more hardware processors 104 of the system 100 are configured to fork the live stream of the tele-robot, captured at step 312 of the method 300, in the tele-conferencing session. The live stream of the tele-robot is forked based on the peer-to-peer connection established (i) between the tele-robot and the broadcaster, or (ii) between the tele-robot and the edge device. As a result of forking, a stream forked from the live stream of the tele-robot is obtained.

Figure 9:
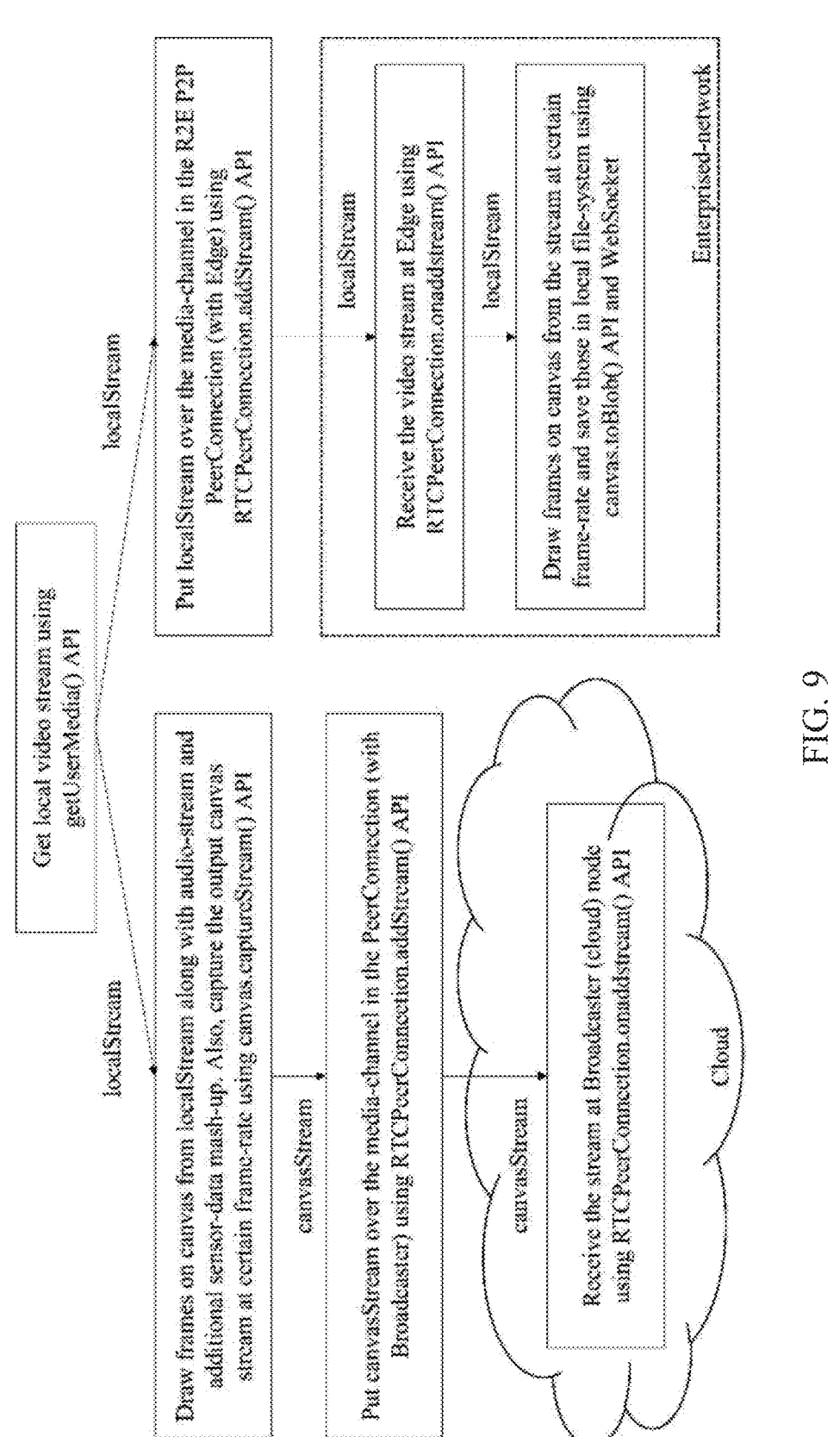
FIG. 9 illustrates exemplary flow diagram for forking a live stream of the tele-robot, in the tele-conferencing session based on the peer-to-peer connection, in accordance with some embodiments of the present disclosure.

FIG. 9 illustrates exemplary flow diagram for forking the live stream of the tele-robot, in the tele-conferencing session based on the peer-to-peer connection, in accordance with some embodiments of the present disclosure. In an embodiment, forking the live stream of the tele-robot, is performed by utilizing a set of application programming interfaces (APIs) present in the Web Real-Time Communication (WebRTC).

FIG. 10 illustrates exemplary flow diagram for forking the live stream of the tele-robot, in the tele-conferencing session, with the peer-to-peer connection established between the tele-robot and the edge device, in accordance with some embodiments of the present disclosure. As shown in FIG. 10, at step 316a1, the live stream of the tele-robot captured at step 312 of the method 300 is obtained, using a media application programming interface. In an embodiment, the media application programming interface is a getUserMedia( ) API present in the WebRTC.

At step 316a2, the live stream of the tele-robot obtained at step 316a1 is published over the uni-directional media channel, in the peer-to-peer connection established between the tele-robot and the edge device, using a stream publishing application programming interface. In an embodiment, the stream publishing application programming a interface is RTCPeerConnection.addStream( ) API present in the WebRTC. At step 316a3, the live stream of the tele-robot, published at step 316a2 is received by the edge device, using a stream receiving application programming interface. In an embodiment, the stream receiving application programming interface is a RTCPeerConnection.onaddStream( ) API present in the WebRTC.

At step 316a4, one or more video frames are extracted from the live stream received at step 316a3. The one or more video frames extracted from the live stream are then put into a container, at a predefined frame rate, to generate a sequence of frames. Lastly, at step 316a5, the sequence of frames obtained at step 316a4 is saved in a local file repository of the edge device, using a file storing application programming interface and a WebSocket. In an embodiment, the file storing application programming interface is a toBlob( ) API present in the WebRTC. The sequence of frames is saved in a local file repository of the edge device in the form of generic binary large object sometimes abbreviated as BLOB (through the toBlob( ) API).

FIG. 11 illustrates exemplary flow diagram for forking the live stream of the tele-robot, in the tele-conferencing session, with the peer-to-peer connection established between the tele-robot and the broadcaster, in accordance with some embodiments of the present disclosure. As shown in FIG. 11, at step 316b1, the live stream of the tele-robot captured at step 312 of the method 300 is obtained, using the media application programming interface. In an embodiment, the media application programming interface is the getUserMedia( ) API present in the WebRTC.

At step 316b2, the one or more video frames are extracted from the live stream received at step 316b1. The one or more video frames extracted from the live stream are then put into a container, at a predefined frame rate, to generate a mashed-up stream from the container. At step 316b3, the mashed-up stream generated at step 316b2 is captured at a predefined frame rate, using a media capture application programming interface. In an embodiment, the media capture application programming interface is a canvas.captureStream API present in the WebRTC.

At step 316b4, the captured mashed-up stream at step 315b3 is published over a media channel, by the tele-robot, using a stream publishing application programming interface. In an embodiment, the stream publishing application programming interface is a RTCPeerConnection.addStream( ) API present in the WebRTC. At step 316b5, the captured mashed-up stream published by the tele-robot at the step 316b4 is received by the broadcaster in the public cloud, using a stream receiving application programming interface. In an embodiment, the stream receiving application programming interface is a RTCPeerConnection.onaddStream( ) API present in the WebRTC. At step 316b6, the captured mashed-up stream received at the broadcaster in the public cloud, at step 316b5 is sent to the plurality of human participants. The stream forked from the live stream of the tele-robot is the sequence of frames that are sent from the tele-robot to the edge device.

At step 318 of the method 300, the one or more hardware processors 104 of the system 100 are configured to process the stream forked from the live stream of the tele-robot, at step 316 of the method 300, by the edge device, from time to time. A sequence of frames is obtained after processing the stream forked from the live stream by the edge device.

At step 320 of the method 300, the one or more hardware processors 104 of the system 100 are configured to process the sequence of frames obtained at step 318 of the method 300, by the edge device, to obtain visual analytics, from time to time. The visual analytics are typically based on the type of application the tele-conferencing session is initiated for. For example, the visual analytics includes face recognition of one of the human participants, predicting navigational path of the tele-robot by understanding surrounding environments, performing semi-automatic kinematic tasks by the tele-robot, and so on.

At step 322 of the method 300, the one or more hardware processors 104 of the system 100 are configured to send the visual analytics, processed at step 320 of the method 300, from time to time, by the edge device to the tele-robot. The visual analytics are sent through the bi-directional data-channel present between the tele-robot and the edge device.

At step 324 of the method 300, the one or more hardware processors 104 of the system 100 are configured to stream one or more processed video frames, to the plurality of human participants through the broadcaster in the tele-conferencing session. The one or more processed video frames are obtained from (i) the live stream from the tele-robot captured at step 312 of the method 300 and (ii) the visual analytics received to the tele-robot at step 322 of the method 300.

The methods and systems of the present disclosure provide a practically deployable resource-friendly application protocol using the WebRTC application programming interfaces (APIs) that enables the same tele-robotic WebRTC session to fork the live feed of the tele-robot for consumption by the edge device, based on the peer-to-peer connection type. Thus, the present disclosure enables the conventional WebRTC to fork the video traffic for one way consumption, which is used for various applications and for video analytics by the edge device for the tele-robot. The WebRTC mechanism of the present disclosure considers all the participating nodes as part of the conference. But, in the given scenario, the edge node (device) is not a participant of the conference but only a consumer of the visual live feed of the tele-robot.

Figure 12:
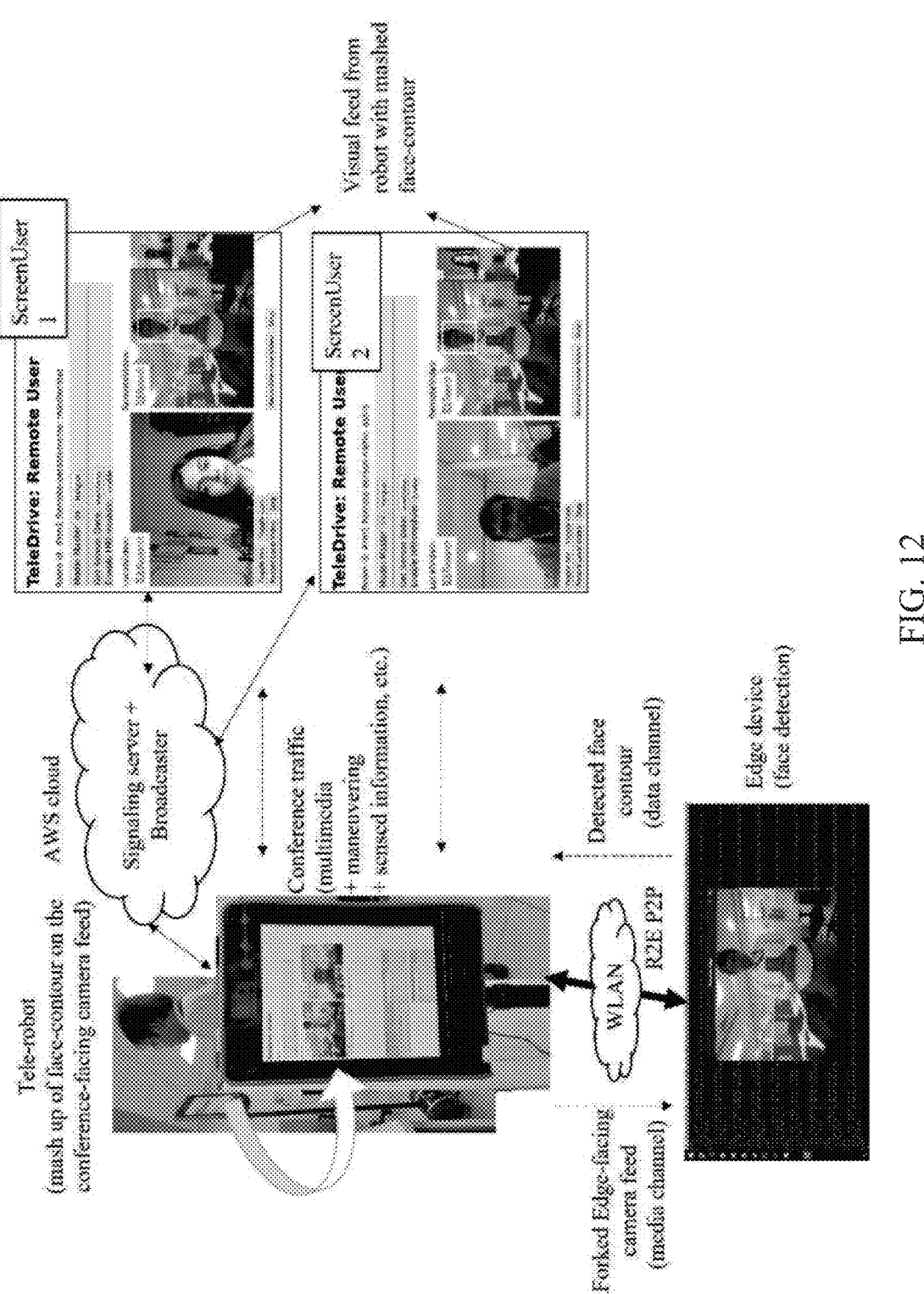
FIG. 12 illustrate an exemplary experimental setup for evaluating a performance of three implementations, in accordance with some embodiments of the present disclosure.

Example Scenario:

Implementation: FIG. 12 illustrate an exemplary experimental setup (in a grey scale) for evaluating a performance of three implementations, in accordance with some embodiments of the present disclosure. JavaScript and Node.JS were used to implement the entire signaling and streaming mechanism. The broadcaster node is implemented using a head-less chrome instance on 'puppeteer' APIs. The broadcaster and the cloud signaling server nodes were hosted on t3.xlarge instance in AWS cloud located in US-East (Ohio) region. The tele-robot was utilized from Double robotics without its native telepresence robot. The edge node (device) was implemented on Ubuntu 20.04 laptop with AMD® Ryzen 5 4500u processor residing within the same enterprising network as the tele-robot.

A practical face-detection application was implemented at the edge node using the 'face detector' library. The peer at the edge device was built using puppeteer. The video frames are captured at the edge node from the incoming video at a configurable rate. The captured frames are fed to the 'face detector' in real-time to generate the bounding boxes. The bounding box coordinates are fed to the tele-robot via the robot-to-edge (R2E) data channel. The tele-robot mashes the bounding box on its live feed on the container (canvas) and streams to the remote user (the active human participant) via the broadcaster. WebSockets were used within the localhost for exchanges between the browser and the implementation software.

Evaluation: The performance of the present disclosure has been evaluated with three implementations. In the first case, a separate WebSocket connection between the tele-robot and the edge device was used (which was not part of the WebRTC signaling ecosystem unlike the architecture of the present disclosure. The first case was named as WebSocket mode. In the second case, a similar signaling mechanism as narrated above was used, but it created only the data channel and no media channel. The second case was named as data channel only mode. In the third case, the similar signaling mechanism as narrated above was used, but it created with both the data channel and the media channel. The third case was named as proposed architecture of the present disclosure.

Figure 13:
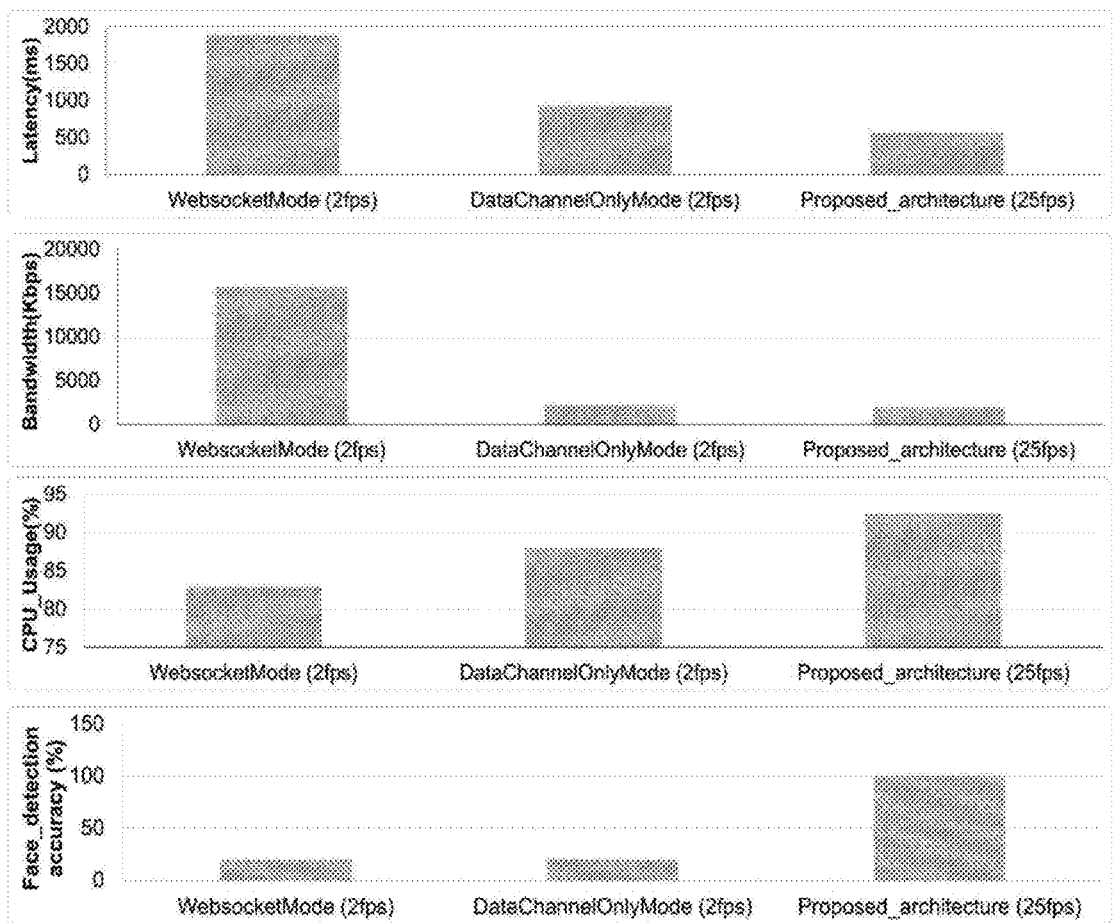
FIG. 13 shows graphs showing the performance of three implementations in terms of a latency, a bandwidth, a CPU usage, and a face detection application, in accordance with some embodiments of the present disclosure.

In both the cases of the WebSocket mode and data channel only mode, the stream canvas (container) was captured and send the captured frames in sequence to the edge device. FIG. 13 shows graphs showing the performance of three implementations in terms of a latency, a bandwidth, a CPU usage, and a face detection application, in accordance with some embodiments of the present disclosure. It was observed that while in the proposed architecture up to 25 fps (frames per second) was achieved, but not more than 2 fps was achieved in the rest of the cases. The latency was much lower in proposed case (the proposed architecture). The bandwidth consumption is also much less in the proposed scheme (the proposed architecture). The main reason observed were (i) in the proposed scheme, the stream was directly forked on the media channel, thus the stream is temporally compressed VP8 and is transmitted over mostly fire-and-forget manner on Secure Real-time Transport Protocol (SRTP) (with very few Real-time Transport Control Protocol (RTCP) feedbacks). But in the other two cases, the stream was sent as frames received from the canvas. That does not have any temporal compression. Also, the transport is Transmission Control Protocol (TCP) and Stream Control Transmission Protocol (SCTP) respectively which has more backward error correction mechanisms to ensure reliability over real-time delivery. Even for the SCTP, though the channel can be made unordered, reliability cannot be completely turned off. However, the energy consumption in proposed architecture was much higher because of the higher rate of streaming and the computation load for VP8 encoding on duplicate media streams, resulting into higher CPU usage.

Further, the face detection (recognition) performance was checked. For this, three candidate technologies were evaluated, which are parallelly running and faces kept on appearing and disappearing in front of the camera. The detection module at the edge device captured frames at 10 fps. As expected, the scheme (architecture) as implemented by the systems and methods of the present disclosure outperformed in the detection percentage.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for establishing an edge-inclusive real-time multimedia tele-conferencing, comprising the steps of:

utilizing, via one or more hardware processors, a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register;

initiating, via the one or more hardware processors, a tele-conferencing session between (i) a plurality of human participants, (ii) a tele-robot, and (iii) an edge device associated with the tele-robot, through a session manager using the Web Real-Time Communication (WebRTC);

forming, via the one or more hardware processors, a plurality of peers for the tele-conferencing session, wherein the plurality of peers comprises: (i) the plurality of human participants, (ii) the tele-robot, (iii) the edge device, and (iv) the broadcaster;

assigning, via the one or more hardware processors, a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B';

advertising, via the one or more hardware processors, by each of the plurality of peers, with the associated unique type identifier along with a connect request, to the cloud signaling server;

capturing, via the one or more hardware processors, a live stream from the tele-robot, over the public cloud;

establishing, via the one or more hardware processors, a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device, comprises:

initiating a signaling by the tele-robot with the cloud signaling server, using the associated unique type identifier 'R';

initiating the signaling by the edge device with the cloud signaling server, using the associated unique type identifier 'E';

notifying by the cloud signaling server to the tele-robot, on an ACTIVE status of the edge device;

offering by the tele-robot to the cloud signaling server, to establish the peer-to-peer connection with the edge device;

relaying the offering by the cloud signaling server to the edge device, to establish the peer-to-peer connection with the edge device;

sending an acknowledgement and a session description, by the edge device, to the cloud signaling server;

relaying the acknowledgement and the session description, by the cloud signaling server, to the tele-robot;

mutually exchanging one or more node properties, by the tele-robot and the edge device; and establishing the peer-to-peer connection between the tele-robot and the edge device, with a uni-directional media channel and a bi-directional data channel;

forking, via the one or more hardware processors, the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot;

processing, via the one or more hardware processors, the stream forked from the live stream of the tele-robot, by the edge device, to obtain a sequence of frames, from time to time;

processing, via the one or more hardware processors, the sequence of frames by the edge device, to obtain visual analytics, from time to time;

sending, via the one or more hardware processors, the visual analytics, from time to time, by the edge device to the tele-robot, through a bi-directional data-channel present between the tele-robot and the edge device; and streaming, via the one or more hardware processors, one or more processed video frames, to the plurality of human participants through the broadcaster in the tele-conferencing session, wherein the one or more processed video frames are obtained from (i) the live stream from the tele-robot and (ii) the visual analytics.

2. The processor-implemented method of claim 1, wherein the edge device is part of the edge-inclusive real-time multimedia tele-conferencing, and invisible to the plurality of human participants.

3. The processor-implemented method of claim 1, wherein forking the live stream of the tele-robot, in the tele-conferencing session, with the peer-to-peer connection established between the tele-robot and the edge device, comprises:

obtaining the live stream of the tele-robot, using a media application programming interface;

publishing the live stream of the tele-robot over a uni-directional media channel, in the peer-to-peer connection established between the tele-robot and the edge device, using a stream publishing application programming interface;

receiving the live stream of the tele-robot, by the edge device, using a stream receiving application programming interface;

extracting one or more video frames from the live stream, and putting into a container at a predefined frame rate, to generate a sequence of frames; and saving the sequence of frames in a local file repository of the edge device, using a file storing application programming interface and a WebSocket.

4. The processor-implemented method of claim 1, wherein forking the live stream of the tele-robot, in the tele-conferencing session, with the peer-to-peer connection established between the tele-robot and the broadcaster, comprises:

obtaining the live stream of the tele-robot, using a media application programming interface;

extracting one or more video frames from the live stream, and putting into a container and to generate a mashed-up stream from the container;

capturing the mashed-up stream at a predefined frame rate, using a media capture application programming interface;

publishing the captured mashed-up stream over a media channel, by the tele-robot, using a stream publishing application programming interface;

receiving the captured mashed-up stream published by the tele-robot, by the broadcaster in the public cloud, using a stream receiving application programming interface; and sending the captured mashed-up stream received at the broadcaster in the public cloud, to the plurality of human participants.

5. A system for establishing an edge-inclusive real-time multimedia tele-conferencing, comprising:

a memory storing instructions;

one or more input/output (I/O) interfaces; and one or more hardware processors coupled to the memory via the one or more I/O interfaces, wherein the one or more hardware processors are configured by the instructions to:

utilize a public cloud and a Web Real-Time Communication (WebRTC) for establishing the edge-inclusive real-time multimedia tele-conferencing, wherein the public cloud comprises a cloud signaling server and a broadcaster, and wherein the broadcaster comprises a media manager and a state register;

initiate a tele-conferencing session between (i) a plurality of human participants, (ii) a tele-robot, and (iii) an edge device associated with the tele-robot, through a session manager using the Web Real-Time Communication (WebRTC);

form a plurality of peers for the tele-conferencing session, wherein the plurality of peers comprises: (i) the plurality of human participants, (ii) the tele-robot, (iii) the edge device, and (iv) the broadcaster;

assign a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B';

advertise by each of the plurality of peers, with the associated unique type identifier along with a connect request, to the cloud signaling server;

capture a live stream from the tele-robot, over the public cloud;

establish a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device, by:

initiating a signaling by the tele-robot with the cloud signaling server, using the associated unique type identifier 'R';

initiating the signaling by the edge device with the cloud signaling server, using the associated unique type identifier 'E';

notifying by the cloud signaling server to the tele-robot, on an ACTIVE status of the edge device;

offering, by the tele-robot to the cloud signaling server, to establish the peer-to-peer connection with the edge device;

relaying, the offering by the cloud signaling server to the edge device, to establish the peer-to-peer connection with the edge device;

sending an acknowledgement and a session description, by the edge device, to the cloud signaling server;

relaying the acknowledgement and the session description, by the cloud signaling server, to the tele-robot;

mutually exchanging one or more node properties, by the tele-robot and the edge device; and establishing the peer-to-peer connection between the tele-robot and the edge device, with a uni-directional media channel and a bi-directional data channel;

fork the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot;

process the stream forked from the live stream of the tele-robot, by the edge device, to obtain a sequence of frames, from time to time;

process the sequence of frames by the edge device, to obtain visual analytics, from time to time;

send the visual analytics, from time to time, by the edge device to the tele-robot, through a bi-directional data-channel present between the tele-robot and the edge device; and stream one or more processed video frames, to the plurality of human participants through the broadcaster in the tele-conferencing session, wherein the one or more processed video frames are obtained from (i) the live stream from the tele-robot and (ii) the visual analytics.

6. The system of claim 5, wherein the edge device is part of the edge-inclusive real-time multimedia tele-conferencing, and invisible to the plurality of human participants.

7. The system of claim 5, wherein the one or more hardware processors are configured to fork the live stream of the tele-robot, in the tele-conferencing session, with the peer-to-peer connection established between the tele-robot and the edge device, by:

obtaining the live stream of the tele-robot, using a media application programming interface;

publishing the live stream of the tele-robot over a uni-directional media channel, in the peer-to-peer connection established between the tele-robot and the edge device, using a stream publishing application programming interface;

receiving the live stream of the tele-robot, by the edge device, using a stream receiving application programming interface;

extracting one or more video frames from the live stream, and putting into a container at a predefined frame rate, to generate a sequence of frames; and saving the sequence of frames in a local file repository of the edge device, using a file storing application programming interface and a WebSocket.

8. The system of claim 5, wherein the one or more hardware processors are configured to fork the live stream of the tele-robot, in the tele-conferencing session, with the peer-to-peer connection established between the tele-robot and the broadcaster, by:

obtaining the live stream of the tele-robot, using a media application programming interface;

extracting one or more video frames from the live stream, and putting into a container and to generate a mashed-up stream from the container;

capturing the mashed-up stream at a predefined frame rate, using a media capture application programming interface;

publishing the captured mashed-up stream over a media channel, by the tele-robot, using a stream publishing application programming interface;

receiving the captured mashed-up stream published by the tele-robot, by the broadcaster in the public cloud, using a stream receiving application programming interface; and sending the captured mashed-up stream received at the broadcaster in the public cloud, to the plurality of human participants.

9. One or more non-transitory machine-readable information storage mediums comprising one or more instructions which when executed by one or more hardware processors cause:

utilizing, a public cloud and a Web Real-Time Communication (WebRTC) for establishing an edge-inclusive real-time multimedia tele-conferencing, wherein the public cloud comprises a cloud signaling server and a broadcaster, and wherein the broadcaster comprises a media manager and a state register;

initiating, a tele-conferencing session between (i) a plurality of human participants, (ii) a tele-robot, and (iii) an edge device associated with the tele-robot, through a session manager using the Web Real-Time Communication (WebRTC);

forming, a plurality of peers for the tele-conferencing session, wherein the plurality of peers comprises: (i) the plurality of human participants, (ii) the tele-robot, (iii) the edge device, and (iv) the broadcaster;

assigning, a unique type identifier for each of the plurality of peers, using one or more predefined type identifiers, wherein the unique type identifier for (i) each human participant of the plurality of human participants is 'U', (ii) the tele-robot is 'R', (iii) the edge device is 'E', and (iv) the broadcaster is 'B';

advertising, by each of the plurality of peers, with the associated unique type identifier along with a connect request, to the cloud signaling server;

capturing, a live stream from the tele-robot, over the public cloud;

establishing, a peer-to-peer connection between the plurality of peers by the cloud signaling server, based on the associated unique type identifier, wherein (i) if the unique type identifier is 'U', then the peer-to-peer connection is established between each human participant and the broadcaster, and (ii) if the unique type identifier is 'E', then the peer-to-peer connection is established between the tele-robot and the edge device, comprises:

initiating a signaling by the tele-robot with the cloud signaling server, using the associated unique type identifier 'R';

initiating the signaling by the edge device with the cloud signaling server, using the associated unique type identifier 'E';

notifying by the cloud signaling server to the tele-robot, on an ACTIVE status of the edge device;

offering, by the tele-robot to the cloud signaling server, to establish the peer-to-peer connection with the edge device;

relaying, the offering by the cloud signaling server to the edge device, to establish the peer-to-peer connection with the edge device;

sending an acknowledgement and a session description, by the edge device, to the cloud signaling server;

relaying the acknowledgement and the session description, by the cloud signaling server, to the tele-robot;

mutually exchanging one or more node properties, by the tele-robot and the edge device; and establishing the peer-to-peer connection between the tele-robot and the edge device, with a uni-directional media channel and a bi-directional data channel;

forking, the live stream of the tele-robot, in the tele-conferencing session, based on the peer-to-peer connection established (i) between the tele-robot and the broadcaster, or (ii) between the tele-robot and the edge device, to obtain a stream forked from the live stream of the tele-robot;

processing, the stream forked from the live stream of the tele-robot, by the edge device, to obtain a sequence of frames, from time to time;

processing, the sequence of frames by the edge device, to obtain visual analytics, from time to time;

sending, the visual analytics, from time to time, by the edge device to the tele-robot, through a bi-directional data-channel present between the tele-robot and the edge device; and streaming, one or more processed video frames, to the plurality of human participants through the broadcaster in the tele-conferencing session, wherein the one or more processed video frames are obtained from (i) the live stream from the tele-robot and (ii) the visual analytics.

10. The one or more non-transitory machine-readable information storage mediums of claim 9, wherein the edge device is part of the edge-inclusive real-time multimedia tele-conferencing, and invisible to the plurality of human participants.

11. The one or more non-transitory machine-readable information storage mediums of claim 9, wherein forking the live stream of the tele-robot, in the tele-conferencing session, with the peer-to-peer connection established between the tele-robot and the edge device, comprises:

obtaining the live stream of the tele-robot, using a media application programming interface;

publishing the live stream of the tele-robot over a uni-directional media channel, in the peer-to-peer connection established between the tele-robot and the edge device, using a stream publishing application programming interface;

receiving the live stream of the tele-robot, by the edge device, using a stream receiving application programming interface;

extracting one or more video frames from the live stream, and putting into a container at a predefined frame rate, to generate a sequence of frames; and saving the sequence of frames in a local file repository of the edge device, using a file storing application programming interface and a WebSocket.

12. The one or more non-transitory machine-readable information storage mediums of claim 9, wherein forking the live stream of the tele-robot, in the tele-conferencing session, with the peer-to-peer connection established between the tele-robot and the broadcaster, comprises:

obtaining the live stream of the tele-robot, using a media application programming interface;

extracting one or more video frames from the live stream, and putting into a container and to generate a mashed-up stream from the container;

capturing the mashed-up stream at a predefined frame rate, using a media capture application programming interface;

publishing the captured mashed-up stream over a media channel, by the tele-robot, using a stream publishing application programming interface;

receiving the captured mashed-up stream published by the tele-robot, by the broadcaster in the public cloud, using a stream receiving application programming interface; and sending the captured mashed-up stream received at the broadcaster in the public cloud, to the plurality of human participants.

* * * * *